(12) United States Patent
Kriger (10) Patent No.: US 10,131,308 B2
(45) Date of Patent: Nov. 20, 2018

(54) SAFETY ON-BOARD VEHICLE MULTI-FORCE RESTRAINT SYSTEM EMPLOYING A WEIGHING MODERATOR

(71) Applicant: Yefim G. Kriger, Ansonia, CT (US)

(72) Inventor: Yefim G. Kriger, Ansonia, CT (US)

( * ) Notice: Subject to any disclaimer, the term of this patent is extended or adjusted under 35 U.S.C. 154(b) by 3 days.

(21) Appl. No.: 15/463,352

(22) Filed: Mar. 20, 2017

(65) Prior Publication Data

US 2017/0267197 A1 Sep. 21, 2017

Related U.S. Application Data

(60) Provisional application No. 62/390,063, filed on Mar. 18, 2016.

(51) Int. Cl.
*B60R 21/015* (2006.01)
*B60R 21/01* (2006.01)

(52) U.S. Cl.
CPC .. *B60R 21/01516* (2014.10); *B60R 21/01546* (2014.10); *B60R 2021/01211* (2013.01)

(58) Field of Classification Search
CPC ........ B60R 21/01516; B60R 21/01556; B60R 2021/01013; B60R 2021/01211
See application file for complete search history.

(56) References Cited

U.S. PATENT DOCUMENTS 5,515,933 A * 5/1996 Meyer .................... B60N 2/002 180/273
5,763,837 A 6/1998 Davignon et al.
(Continued)

OTHER PUBLICATIONS

Automobile Brakes Tutorial downloaded from Carparts website Apr. 12, 2016.

(Continued)

*Primary Examiner* — Drew J Brown
(74) *Attorney, Agent, or Firm* — Cantor Colburn LLP (57) ABSTRACT

A safety on-board vehicle multi-force restraint self-controlling system improves the security of the air bags for children and light women passengers according requirements of the final rule of Section § 571.208 Standard No. 208; "Occupant crash protection" by employing the accurate weight occupant KEF technology. The system also provides, in case of an accident, different forces applied to the occupant bodies of different weight categories by employing an original occupant's weight, measured at the beginning of a trip by innovative weighing KEF technology, which is eventually modified during the trip according to the current values of the morphological and driving factors. The system provides secure personalization of the occupants' weight by a finger print sensor. From beginning and during the trip, an extracting unit continuously monitors the needed combination of openings that gives an access for the extra gas to move from inflator to the atmosphere by a signal from the crash sensor, and the combination satisfies the code of the accurate original weight of the occupant, modified according to the current morphological and the car trip situation parameters: car crash severity, position of the occupant, seat belt state, and other possible parameters of the current trip situation. The multi-force restraint system provides a self-control and prevents the inflator from rupturing when an excessive internal pressure is produced.

19 Claims, 5 Drawing Sheets

(56) References Cited

U.S. PATENT DOCUMENTS

| | | | |
|---|---|---|---|
| 5,986,221 A | 11/1999 | Stanley | |
| 6,076,853 A | 6/2000 | Stanley | |
| 6,181,996 B1 | 1/2001 | Chou et al. | |
| 6,242,701 B1 | 6/2001 | Breed et al. | |
| 6,345,839 B1 | 2/2002 | Kuboki et al. | |
| 6,448,890 B1* | 9/2002 | Cooper | B60R 21/01554 180/273 |
| 6,585,328 B1 | 7/2003 | Oexman et al. | |
| 6,649,848 B2 | 11/2003 | Kriger | |
| 6,816,807 B2 | 11/2004 | Kriger | |
| 7,134,715 B1 | 11/2006 | Fristedt et al. | |
| 7,330,784 B2* | 2/2008 | Johnson | B60N 2/002 701/45 |
| 7,465,272 B2 | 12/2008 | Kriger | |
| 7,774,212 B2 | 8/2010 | Huang et al. | |
| 7,803,111 B2 | 9/2010 | Kriger | |
| 7,910,840 B2 | 3/2011 | Chai | |
| 8,388,532 B2 | 3/2013 | Morgan | |
| 8,417,422 B2 | 4/2013 | Choi et al. | |
| 8,552,661 B2 | 10/2013 | Kriger | |
| 9,566,877 B2* | 2/2017 | Kriger | A61B 5/6893 |
| 2001/0033074 A1* | 10/2001 | Aoki | B60R 21/01532 280/735 |
| 2002/0003344 A1* | 1/2002 | Maeda | B60R 22/415 280/733 |
| 2003/0042051 A1 | 3/2003 | Kriger | |
| 2003/0130595 A1 | 7/2003 | Mault | |
| 2004/0148127 A1 | 7/2004 | Kriger | |
| 2005/0101875 A1 | 5/2005 | Semler et al. | |
| 2005/0194192 A1 | 9/2005 | Kriger | |
| 2007/0185391 A1 | 8/2007 | Morgan | |
| 2007/0244375 A1 | 10/2007 | Jenkins et al. | |
| 2008/0046152 A1 | 2/2008 | Ohtake et al. | |
| 2008/0046291 A1 | 2/2008 | Huang et al. | |
| 2008/0093143 A1 | 4/2008 | Harrison | |
| 2008/0294370 A1 | 11/2008 | Kriger | |
| 2009/0132099 A1 | 5/2009 | Kriger | |
| 2009/0182204 A1 | 7/2009 | Semler et al. | |
| 2009/0314556 A1 | 12/2009 | Harris | |
| 2010/0138078 A1* | 6/2010 | Choi | G01G 19/4142 701/1 |
| 2010/0327638 A1 | 12/2010 | Petereit et al. | |
| 2011/0096558 A1 | 4/2011 | Kriger | |
| 2011/0183870 A1 | 7/2011 | Pan et al. | |
| 2012/0312604 A1* | 12/2012 | Fujii | G01G 19/4142 177/1 |
| 2013/0011819 A1 | 1/2013 | Horseman | |
| 2013/0012786 A1 | 1/2013 | Horseman | |
| 2013/0012790 A1 | 1/2013 | Horseman | |
| 2013/0013327 A1 | 1/2013 | Horseman | |
| 2013/0117040 A1 | 5/2013 | James et al. | |
| 2013/0218487 A1* | 8/2013 | Fujii | B60N 2/002 702/41 |
| 2014/0163333 A1 | 6/2014 | Horseman | |
| 2014/0239980 A1 | 8/2014 | Ootaka | |
| 2014/0275834 A1 | 9/2014 | Bennett | |
| 2014/0353048 A1 | 12/2014 | Kriger | |
| 2016/0096498 A1* | 4/2016 | Kubota | B60R 21/01546 73/1.15 |
| 2016/0107596 A1* | 4/2016 | Park | B60N 2/002 73/865 |
| 2016/0163319 A1 | 6/2016 | Parundekar et al. | |

OTHER PUBLICATIONS

Guo et al. "Predicting overweight and obesity in adultgood from body mass index values in childhood and adolescence 1-3" 2002.

Magarey et al. "Predicting obesity in early adulthood from childgood and parental obesity" 2003.

Nyhol et al. "The Validity of Obesity Based on Self-reported Weight and Height: Implications for Population Studies" 2007.

\* cited by examiner

SAFETY ON-BOARD VEHICLE MULTI-FORCE RESTRAINT SYSTEM EMPLOYING A WEIGHING MODERATOR

CROSS REFERENCE TO RELATED APPLICATIONS

This application claims the benefit of U.S. Provisional Application No. 62/390,063 filed on Mar. 18, 2016, the contents of which are incorporated herein by reference thereto.

This application is related to U.S. patent application Ser. No. 15/430,219 filed on Feb. 10, 2017, which is a divisional of U.S. patent application Ser. No. 14/282,715 filed on May 20, 2014 now U.S. Pat. No. 9,566,877 which issued on Feb. 14, 2017 and claims priority to U.S. Provisional Application No. 61/956,059 filed on May 30, 2013, the contents each of which are incorporated herein in their entirety by reference thereto.

FIELD OF THE INVENTION

Various embodiments of the present invention are directed to the methods and system that provide a different value of a force applied to the body of the different weight occupants of a vehicle for their safety in case of a collision. More specifically, the invention stresses the advantages of employing a multi-force air bag restraint system wherein the value of the gas moved to the air bag is controlled by the modified accurately measured original weight of the vehicle occupant including the foot part of the body employing a simplified vehicle occupant weighing apparatus comprising one weighing unit attached to the seat of the occupant and a weighing moderator.

BACKGROUND OF THE INVENTION

The problem of vehicle occupant safety has now become a nation-wide problem for the USA and other countries. More than 95% of American cars are equipped by safety systems such as Supplemental Restraint System (SRS) comprising an air bag. For example, a front air bag restraint system has an air bag, which is deployable between an instrument panel and an occupant seat within an automotive vehicle. When the vehicle includes an occupant restraint device arranged to protect the occupant during a crash involving the vehicle, it can be coupled to the weight measuring system and arranged to provide a variable deployment depending on the determined weight of the occupying item. During a crash event, the vehicle's crash sensor and other sensors provide crucial information to the air bag Electronic Controller Unit (ECU), including collision type, angle and severity of impact etc. Using this information, the air bag electronic controller unit's crash algorithm determines if the crash event meets the criteria for air bag deployment and triggers various firing circuits to deploy one or more air bag modules within the vehicle. Working as a supplemental restraint system to the vehicle's seat belt system, air bag module deployments are triggered through a pyrotechnic process that is designed to be used once. The signals from the various sensors are fed into the air bag computing and control unit, which determines from them the position of the vehicle occupant, the severity or force of the crash, along with other variables. Advanced air bag technologies are being developed to tailor air bag deployment to the severity of the crash, the weight and position of the vehicle occupant, belt usage, and how close that person is to the actual air bag. Many of these systems use multi-stage inflators that deploy less forcefully in stages in moderate crashes than in very severe crashes. Occupant sensing devices let the air bag control unit know if someone is occupying a seat adjacent to an air bag, the mass/weight of the person, whether a seat belt or child restraint is being used, whether the person is forward in the seat and close to the air bag, and other possible parameters.

Under some rare conditions, air bags can injure and, in some very rare instances, kill vehicle occupants. To provide crash protection for occupants not wearing seat belts, recent "smart" air bag controllers can recognize if a seatbelt is used, and alter the air bag cushion deployment parameters accordingly.

To improve safety of passengers in case of a possible crash, adaptive and advanced duel-depth air bag systems were designed according to the Passenger Classification System. Adaptive air bag systems may utilize multi-stage air bags to adjust the pressure within the air bag. The greater the pressure within the air bag, the more force the air bag will exert on the occupants as they come in contact with it. These adjustments allow the system to deploy the air bag with a moderate force for most collisions, reserving the maximum force air bag only for the severest of collisions. Additional sensors to determine the location, weight or relative size of the occupants may also be used. Information regarding the occupants and the severity of the crash are used by the air bag control unit, to determine whether air bags should be suppressed or deployed, and if so, at various output levels.

In the advanced duel-depth air bag, the first and second chambers of the air bag are selectively pressurized with a gaseous fluid. The valve member is operable to distribute the pressurized fluid to one chamber, both of the chambers of the air bag, or to the atmosphere. The design of the advanced duel-depth air bag system shows that the car manufacturers try to improve the vehicle occupant safety employing the Passenger Classification System (U.S. Pat. No. 8,417,422) by multiplying the number of stages of an air bag.

According to one published Passenger Classification System and crash severity information, the air bag in the advanced duel-depth air bag system is deployed at either at a high force level, a less forceful level, or not at all, as following:

45 pounds or less was relayed as an infant or toddler. In this category, the air bag was automatically shut off and would not deploy.

46-108 pounds was relayed as a child or small adult. In this category, depending on the severity of the crash, the low side of the air bag may have been deployed.

109 pounds and above was considered a full size adult. In this category, depending on all other factors, the high side of the air bag may have been deployed.

As we may see from this Passenger Classification System, the force applied by an air bag in the advanced duel-depth air bag system is the same as applied to the person whose weight is 109 Lb and applied to the person whose weight is even 400 Lb or higher. A light occupant in such situation may be injured and heavy occupant may be not protected enough. This is the reason that it is necessary to provide more classes in the Passenger Classification System to differentiate the forces applied to adult occupants in case of collision according to their weight.

In some vehicles, an inflator could produce excessive internal pressure upon deployment. If an affected air bag deploys, the increased internal pressure may cause the inflator to rupture. In the event of an inflator rupture, metal fragments could pass through the air bag cushion material possibly causing serious injury or fatality to vehicle occupants. Past ruptures like this have killed or injured vehicle drivers. There have been reports of severe, and sometimes, lethal injuries due to defective gas generators projecting shrapnel towards the vehicle occupant's face and neck upon air bag deployment. This resulted in a massive recall being issued in the U.S. in 2015 and 2016, involving over 30 million vehicles.

From 1990 to 2000, the United States National Highway Traffic Safety Administration identified 175 fatalities caused by air bags. Most of these (104) have been children, while the rest were adults.

262 deaths from 1990 to 2006 reportedly have been caused by air bags inflating in low severity crashes, most of them in older model vehicles. These deaths include 87 drivers, 13 adult passengers, 138 children, and 24 infants.

These statistics show that the number of the victims is indirectly proportional to their weight. It means that to significantly improve safety of the vehicle occupants it is necessary to put stress on controlling the forces applied to the occupants' bodies by more accurately measuring their weights. There are many kinds of sensors and devices designed to measure weight of a vehicle occupant. These sensors are used for measuring the weight of an occupant in a vehicle seat which evaluates the occupancy of the seat and helps to define the location and orientation of the occupant, which is very important in safety systems. These sensors provide a seat pressure or weight measurement system and thereby improve the accuracy of another apparatus or system which utilizes measured seat pressure or weight as input.

In the U.S. Pat. No. 6,076,853 is disclosed an occupant weight measuring system related to bladder sensors and that works in an air bag safety system. The entire contents of U.S. Pat. No. 6,076,853 are incorporated herein by reference thereto. In the U.S. Pat. No. 7,330,784 disclosed a weight measuring system arranged in connection with the support structure of a seat for determining an approximate weight of an occupying item of the seat. The entire contents of U.S. Pat. No. 7,330,784 are incorporated herein by reference thereto. The weight measuring system consists of strain gage sensors, arranged at the rearward and forward locations of the seat. Each sensor provides data relating to the force or pressure being applied at the respective location which is used to derive the approximate weight of the occupant. It is noted that the weight measured here will not be the entire weight of the occupant since some of the occupant's weight will be supported by his or her feet which are resting on the floor or pedals. Contribution of the weight of the foot part of the body to a total weight of a person may be evaluated very easily, and it is about 20-30% of the whole body weight. This is a problem that does not allow to accurately weigh a vehicle occupant in on-board vehicle supplemental restraint system to provide a possibility of an accurate control of the air bag inflation force depending on a real value of the occupant's weight (mass) and eliminate extra force applied to the occupant's body at the time of collision. So, to accurately weigh a vehicle occupant, it is necessary to weigh the whole body of a vehicle occupant including real weight of a foot part of his/her body. It is not made in the SRS system yet.

The Transportation Equity Act for the 21st Century specified that the modern air bag systems should provide improved protection for occupants of different sizes as well as minimize the risk of injury or death from air bags for infants, young children, and other occupants. On May 12, 2000, National Highway Traffic Safety Administration (NHTSA) issued a rule specifying the requirements for such a system.

NHTSA, Department of Transportation, published in August 2004 requirements of the final rule of Section § 571.208 Standard No. 208; "Occupant crash protection" to improve the security of the air bags for children and light passengers.

OBJECTS OF THE INVENTION

It is a principal object of the present invention to improve the security of the air bags for children and light women passengers. This can be done by employing the accurate weight occupant KEF technology described in U.S. Pat. No. 9,566,877. The entire contents of U.S. Pat. No. 9,566,877 are incorporated herein by reference thereto. This KEF technology much faster than weighing a person on a floor scale and accurate without a 20-30% error that conventional on-board vehicle weighing devices have while weighing a whole adult occupant's body including the foot part.

To show how it works, let us to compare the Nissan's Occupant Classification System described in the [1. Development of occupant classification system, by Tsutomu Takano, Nissan Motor Co. LTD Japan. Paper Number 206] and the Occupant Classification System based on the KEF technology described in the U.S. Pat. No. 9,566,877. As published in paper 206, the difference between the MAX children's weight 30.1 Kg and MIN weight of the 5th percentile adult female 37.4 Kg is 7.3 Kg.

In the present invention, the difference between the MAX children's weight 30.1 Kg and MIN weight of the 5th percentile adult female 46.7 Kg measured by the KEF technology will be 16.6 Kg. These accurate measurements employing the KEF occupant weighing technology drastically (the difference between the MAX children's weight and MIN weight of the 5th percentile adult female becomes 16.6 Kg instead of 7.3 Kg.) minimize the risk of injury or death from air bags for infants, young children, and small women by improved recognizing these two classes of the Occupant Classification System.

It is a principal object of present invention also to improve the security of the air bags for children by hierarchical monitoring activated children' seats:

1. The high monitoring level is provided by a signal from the child's seat to the Computing and Control unit when the child's seat was installed. The high monitoring level signal is received through the special Electrical connector and colored code to discriminate different children seats. This level allows the Computing and Control unit to get basic data about child-occupant if any.

2. The low monitoring level is provided by weighing the child's car seat and sending a warning if the measured weight of the child doesn't satisfy the requirements of the child seat category defined in the previous level of the hierarchical monitoring.

It is a principal object of present invention specified in the provided above NHTSA documents that the modern air bag systems should provide improved protection for occupants of different sizes. So, it is a principal object of present invention to provide a Multi-Force Supplemental Restraint Self-controlling system (MFORS) by controlling the force applied by the air bag to the occupant's body with the accurately measured weight of the occupant, whose measurement is made by the innovative weight measuring KEF technology.

A further principal object of the present invention is to provide an accurate measuring weight of the vehicle occupants in a safety system because the statistics show that the number of the accident victims depends on their weight. The lower the weight of the occupants, the larger the number of the victims of this weight category. More accurate method of measuring weight of the vehicle occupants may be provided by weighing the occupant's whole body including the weight of the foot by employing only one weighing unit attached to the occupant's car seat. This provides the possibility to extend the current Passenger Classification System and more accurately control the force applied to lighter weighing people and youngsters in case of accident.

A further principal object of the present invention is to provide a Multi-Force Supplemental Restraint Self-controlling system (MFORS system) for safety protection of the different weight occupants of a vehicle by applying different forces to their bodies through the air bag at the moment of an accident depending on their modified weights (MW) that in turn depends on the morphological data and factors of the car trip current situation that influence the force applied to the occupant's body. This force is larger for the heavier occupant and smaller for the lighter occupant and controlled by the calculated occupant's modified weight MW.

A further principal object of the present invention is to provide simplified, convenient, and more accurate weight measurements of a driver in an air bag system of a running self-driving car.

A further principal object of the present invention is to provide simplified and more secure weight measurements of the occupants that are members of one family. By using fingerprint sensors, the members of one family sitting in a vehicle may now securely exchange the car seats they usually use without any mistakes in their memorized weight measurements.

It is a principal object of the present invention to provide a MFORS system that prevents the inflator rupture when an excessive internal pressure upon air bag deployment is produced. In this case, the excessive internal pressure in the inflator will be decreased by removing part of the gas into the atmosphere through one or more of the openings.

A further principal object of the present invention is to provide a method and system for an accurate weight measurement of an occupant sitting on the seat, to which a weighing unit is attached, and the system is having: a weighing unit operatively connected to a seat of a vehicle, wherein the weighing unit is configured to provide an output indicative of an occupant's weight who is seated on the seat, and an Electronic Computing and control Unit (ECU) operatively coupled to the weighing unit, and a switch operatively coupled to the computing and control unit, and the switch being located behind a vertical surface of the vehicle proximate to the seat, wherein the switch is configured to provide an output when a force is applied to the switch, wherein the computing and control unit only processes the output from the weighing unit when the output of the switch is received.

Prior to the present invention, there was no safety providing system with an accurate weighing of occupant with improved protection for occupants of different sizes as well as minimize the risk of injury or death from air bags for infants, young children, and other occupants.

SUMMARY OF THE INVENTION

These objects and others, which will become apparent hereinafter, are attained in accordance with the invention in an automotive vehicle equipped with the safety air bag Multi-Force Supplemental Restraint Self-controlling system (MFORS) system that provides higher protection of the different weight occupant bodies from the extra force applied to them in case of accident by decreasing it according to the accurate occupant's whole body weight measurement and extending the Passenger Classification System.

One embodiment of the present invention relates to a vehicle having an air bag safety system and an innovative weighing technology for use in the accurate weighing of an occupant based on a weighing moderator to prevent extra force applied to the occupant's body in case of collision.

Another feature of the present invention is that it provides modification of the occupant's original weight accurately measured by the innovative weighing technology at the beginning of a trip in accordance with the values of such parameters as the severity or force of the crash, position of the vehicle occupant in the seat, seat belt usage at the moment of crash. Of course, the other parameters measured during the trip such as the seatback angle between the bottom portion of the seat and its back portion, whether the person is forward in the seat, and other possible parameters may be used for the modification of the occupant's original weight.

Another feature of the present invention is that it provides the accurate and more secure weight measurements of the occupants that are members of one family. By using fingerprint sensors, the members of one family seating in a vehicle may now securely exchange the car seats they usually use or share the seats without any mistakes in their memorized weight measurements.

Another feature of the present invention is that it provides modification of the accurate occupants' weight measurements made according to the innovative weighing technology to use them in the safety MFORS system at the moment of a collision to provide different partial forces applied to the bodies of the occupants of different weights by the air bag deployment.

Another feature of the present invention is that it provides calculating and memorizing of the vehicle occupant's weight/mass in the ECU of the MFORS system during the modification of the occupant's original weight measured according to the innovative weighing KEF technology, and it employs the modified occupant's weight in the safety MFORS system at the moment of the possible collision.

In another embodiment of the present invention, the MFORS system provides safety protection of the different weight occupants by extracting a part of the gas generated by the inflator in case of collision to outside air through several openings in the diffuser, which connects the inflator and air bag. The diffuser has an output for connection with the air bag and several different size openings, which are controlled by the extracting unit. The amount of the gas extracted through this alternative path to outside air depends on the weight of the occupant modified during a trip. In this case, the internal pressure inside of the air bag is controlled by the output signal of the ECU that is proportional to the accurately measured and eventually modified occupant's original weight MW. In turn, the output signal of the ECU controls the level of the excessive internal pressure inside of the air bag by moving part of the gas outside to the atmosphere through the openings made between the inflator and airbag. The size of the opened/closed area or/and the number of the opened/closed openings on the surface of the diffuser is controlled by an extracting unit whose input signal is received from the output of the ECU.

In another embodiment of the present invention, each control signal for the air bag deploying, that is proportional to the each memorized weight, will be sent by the computing and control unit to the extracting unit and will adjust the state (open-closed) of diffuser openings: the lighter a person, the smaller output of the weighing unit, the smaller the output of the computing and control unit, the smaller the input of the extracting unit, and, as result, there are fewer closed openings. For the lighter vehicle occupant, a larger amount of the gas from the inflator is moving through the openings in the diffuser outside to the atmosphere. The lower the value of the internal excessive pressure inside of the inflator, the less possibility for the inflator to rupture, and the less force applied by air bag to the occupant's body in case of an accident.

In one embodiment of the present invention, a certain part of the gas generated by the inflator of the proposed MFORS system in case of collision is extracted to outside air by an extracting unit that controls the openings located in the diffuser that connects the inflator and air bag.

In another embodiment of the present invention, the MFORS system prevents the inflator from rupturing. As was mentioned previously, one of principal objects of the present invention is to provide a MFORS system that prevents the inflator's rupture when an excessive internal pressure upon air bag deployment is produced. For this purpose, the excessive internal pressure in the inflator of the MFORS system is decreased by removing a part of the gas from the inflator when the pressure in it is higher than a predetermined value to the atmosphere through at least one of the openings in the diffuser.

In another embodiment of the present invention, the diffuser has an output for connection with the air bag and several different size openings, which are controlled by the extracting unit. The amount of the gas extracted through this alternative path depends on the weight of the occupant modified during a trip. In this case, the internal pressure inside of the air bag is controlled by the output signal of the Supplemental Microcontroller corrected by the ECU and is proportional to the accurately measured occupant's weight. This output signal controls the level of the excessive internal pressure inside of the air bag by moving part of the gas outside to the atmosphere through the openings between the inflator and air bag. The size of the opened/closed area and the number of the opened/closed openings on the surface of the diffuser are controlled by an extracting unit whose input signal is received from the output of the inverting latches.

In another embodiment of the present invention, the diameter of the largest opening (if it is opened) has to remove half of the amount of the gas from the output of the inflator to outside air, and the rest of the gas has to go to the air bag. The diameter of the next opening (if it is opened) has to remove one quarter of the amount of gas from the output of the inflator to outside air, and another three quarters of gas from the output of the inflator have to go to the air bag. So, the diameters of the openings are related to each other by binary numbers. For example, to get the MFORS system that will control the appropriate different forces applied to the bodies of 7 different weight category occupants, there are 3 different controlled openings in the diffuser. The diameters of these 3 controlled by the extracting unit openings will remove (if one opening is opened) to outside air ⅛, ¼, and ½ part of the amount of the gas from the output of the inflator accordingly, and the rest (⅞, ¾, and ½) have to go to the air bag. To get the MFORS system that will control the appropriate different forces applied to the bodies of 15 different weight categories of occupants, it is necessary to have 4 different openings in the diffuser. To satisfy this function, the diameters of the openings, probably, will not be precisely related to each other by binary numbers because of the possible restrictions of the diffuser surface shape. In this case, the diameters of the openings will be related to each other closely to the binary numbers, and it will be reasonable to call them as effective diameters.

For the heaviest occupant and the severest crash and the worst morphological position of the occupant and driving factors of the car trip situation, the digital code of the input signal applied to the buffers of the extracting unit is 000. In this case, none of the openings will be open, and whole volume of the gas produced by inflator will apply the maximum force to the body of the occupant through the air bag.

There are several methods to control the gas moving from inflator to the air bag by rerouting it to the atmosphere by controlling an opening of the diffuser. In one embodiment of the present invention, each opening of the diffuser is isolated by a pre-opener wall from the outside air. To remove a part of the gas moving from inflator to the air bag through an opening to the atmosphere, it is necessary to destroy the pre-opener wall or by making a hole in it that has a size several times larger than the appropriate opening. In this case, a part of the gas will move from inflator through the opening and a hole in the pre-opener wall to the atmosphere instead of moving to the air bag. There are several methods to open a pre-opener wall of the diffuser.

In another embodiment of the present invention, the extracting unit opens the pre-opener wall by explosion of a small portion of a primary explosive located inside of the pre-opener wall between the according opening and atmosphere, and the detonator of this explosive is powered by the according buffer of the extracting unit. The thickness of the pre-opener wall may be half or less than thickness of the diffuser because the pressure on the pre-opener wall through the opening with the largest diameter can't be larger than a half of the pressure in the inflator.

In another embodiment of the present invention, the extracting unit opens the pre-opener wall of the opening by explosion of a small portion of a primary explosive located inside of the pre-opener wall between the appropriate opening and atmosphere, and the detonator of this explosive is ignited by hitting it with a force of the armature of a solenoid controlled by the according buffer of the extracting unit.

In another embodiment of the present invention, there is a rupturing disk, which has a circle-shape score in the middle and welded across the according opening. The extracting unit opens such rupturing disk by explosion of a small portion of a primary explosive located proximate to it. The detonator of this explosive is controlled by the according buffer of the extracting unit.

In another embodiment of the present invention, the extracting unit controls by its according buffer an electrical valve that removes a part of the gas, moving from inflator to the air bag, to the atmosphere when the valve opens. In this embodiment the inverting latch is not used.

In another embodiment of the present invention to decrease the timing, the extracting unit controls by its buffer a valve, through which the gas is coming from the inflator to the rupturing disk that is in front of appropriate opening in the diffuser. The coming gas ruptures the disk and moves into the atmosphere through the opening.

In another embodiment of the present invention, a throttle-type control unit is employed to remove a part of the gas moving from inflator to the air bag to atmosphere. This device is analogous to a regular automobile throttle, but works in the opposite direction. Let's call this device a mini-throttle. The input substance of the regular automobile throttle is air, and this air is mixed at the output of the throttle with gasoline. The input substance of the mini-throttle is a hot gas generated in the inflator, and an output of the mini-throttle is an outside atmosphere. The mini-throttle moves part of gas from the inflator to outside atmosphere by the input signal depending on the modified weight signal MW. The mini-throttle in turn is controlled by a 80°-90° angle analog or digital servomechanism (servo) having a metal gear and employing a position transducer. The appropriate servomechanism may be found in the servo data base ServoDatabase.com.

In another embodiment of the present invention, the extracting unit employs a hole puncher to control a part of the gas that will move into the atmosphere. The punch of the hole puncher is controlled by an electromagnet and located above the material of the air bag proximate to the point where the material of the air bag is attached to the inflator. The matrix of the hole puncher is located on the surface of the inflator (diffuser) underneath the material of the air bag. The electromagnet of the hole puncher is controlled by a voltage pulse generated by a capacitor controlled by a switch connected to the according buffer of the extracting unit. This voltage pulse is generated in the same way as the voltage pulse to activate the igniter is generated. When a signal of collision is received from the sensor, the according buffer of the extracting unit turns on a switch to discharge the according capacitor, which creates a pulse for the electromagnet of the hole puncher, which in turn hits the surface of the air bag, cuts it, and makes a hole in it through which a part of the gas moving from inflator (when the inflator will be activated) to the air bag, will move to the atmosphere.

Of course, there may be other methods to control and remove a part of the gas moving from inflator to the air bag to the atmosphere by controlling the opening of the diffuser depending on the modified weight of the vehicle's occupant.

In another embodiment of the present invention, the self-controlling on-board vehicle multi-force restraint system is provided wherein the supplemental microcontroller provides continuous control of the system's main function by using current trip signals and test signals. To assess the grade of the MFORS system functionality, the supplemental microcontroller employs the original weight W of the occupant, occupant's position signal, seat belt state signal, and emulates a severity collision signal. To decrease the time of the extracting unit reaction in case of the collision, the predetermined value of the emulated severity crash signal has to be close to 50% of a maximum predicted in the system severity crash level signal. After modifying the original occupant's weight W signal and calculating the predicted (according to the value of the modified weight MW) conditions of the output buffers of the extracting unit, the supplemental microcontroller compares these conditions with the real current signals received from the output buffers of the extracting unit. Additionally, the supplemental microcontroller checks the signal from the mini-throttle position sensor. The supplemental microcontroller issues a warning if a problem in the MFORS system functionality is found. In case of collision, all signals mentioned above are memorized in the computing and control unit.

In another embodiment of the present invention, the MFORS system provides a method of preventing extra force applied to the different weight categories vehicle occupants at a crash situation comprising the following steps:

accurate weighing a vehicle occupant at the beginning of a trip according to the KEF technology by a weighing unit attached to his/her car seat;

memorizing the measured original weight W of the occupant in the memory of the computing and control unit and supplemental microcontroller;

modifying the original weight of the vehicle occupants by the current values of the morphological data and factors of the car trip situation and by employing tables and functions of the correlation coefficients and their combinations memorized in the memory of the computing and control unit according to the function $$MW = f(W, C_s, C_b, C_p, \ldots, C_n), \quad (1)$$

where W is the original weight of the occupant,

MW is modified weight of the occupant by the current data received from the morphological sensors and factors of the car trip situation, $C_s, C_b, C_p, \ldots, C_n$ are correlation coefficients employed in the current SRS and their combinations memorized in the memory of the computing and control unit according to a table data or solving system of equations provided by the car manufacturer as a result of theoretical and/or experimental research where the modified weight MW is a function of n variables that are the correlation coefficients $C_s, C_b, C_p, \ldots, C_n$, and the original weight W of each occupant is a constant during the trip;

providing prevention of extra force applied to the different weight categories of the vehicle occupants by extracting to outside atmosphere a part of the gas moving from the inflator to the air bag by employing the supplemental microcontroller, inverting latches, extracting unit, and openings in the diffuser according to the function $$F_o = \mu_o * F_h, \quad (2)$$

where $F_o$ is a force applied to the occupant by the air bag in the current MFORS system, $F_h$ is a permitted maximal force applied to the heaviest occupant by the air bag in the current MFORS, $\mu_o$ is a relative position of the occupant's weight category to the maximal predefined weight of an occupant in the prospective extended Occupant Classification System that depends on the number of openings in the diffuser of the current MFORS, and $$\mu_o = MW/W_h, \quad (3)$$

where $W_h$ is the maximal predefined weight of an occupant in the prospective extended Occupant Classification System.

A maximal binary code $B_M = 111$ is applied by the supplemental microcontroller to the inverting latches when $F_o = F_h$ and the diffuser of the inflator has 3 openings.

In another embodiment of the present invention, the MFORS system uses a dual-chamber air bag and a 3-bit extracting unit. In this case, the system has total 4-bit control code: the most significant bit will control the chambers of the dual-chamber air bag 9 according to the level of a crash severity. The other 3 digits of the control code will be received from the SM microcontroller 12 and will control the 3 openings of the diffuser 10. The maximum control code for the heaviest occupant of the MFORS, which uses a dual-chamber air bag, will be 1111 for the 3-bit extracting unit and 11111—for the 4-bit extracting unit.

In another embodiment of the present invention, the number of the openings are not restricted.

In another embodiment of the present invention, a method of accurate weighing of an on-board vehicle occupant and employing the weight to control a force applied to the occupant's body by the air bag while it is deployed in case of accident in the multi-force restraint MFORS air bag system is provided by a weighing unit connected to the seat of a vehicle occupant and employing a weighing moderator secured on a vertical part of a steering wheel, dashboard, or front door, and the weighing moderator has a switch sending a signal to the computing and control unit while it has been compressed, comprising the steps of:

compressing in a horizontal direction by an occupant's finger a weighing moderator, whose switch is located on a vertical part of a vehicle and starts sending a signal to the computing and control unit while it has been compressed, continuing to compress the weighing moderator while the occupant is moving feet up from any surface and keeping them in the air during the weight measurement;

the computing and control unit by receiving a signal from the weighing moderator starts to memorize the output of the weighing unit, collecting by computing and control unit needed number of occupant's weight samples and processing collected data by computing and control unit;

modifying the computed weight according to morphological parameters and parameters and factors of the car trip current situation and all their combinations according to the correlation coefficients;

controlling the force applied to the occupant's body by the signal according to the modified weight of the vehicle occupant.

In another embodiment of the present invention, a method of accurate weighing a driver in an air bag system of a running self-driving car and employing the weight to control a force applied to the body of different weight drivers by the air bag while it is deployed in case of accident in the multi-force restraint MFORS air bag system is provided.

Another exemplary embodiment of the present invention, that the multi-force restraint MFORS air bag system employs a weighing moderator located on a vertical piece of the dashboard against the front passenger of the car, and the front passenger of the vehicle presses this weighing moderator in a horizontal direction by a finger and produces a force, which provides him/her a support to conveniently lift up his/her feet during the weight measurement.

Yet another exemplary embodiment of the present invention that the multi-force restraint MFORS air bag system employs a weighing moderator which consists of a fingerprint sensor, whose touch surface or sensing surface is located vertically, and it is pressed by the occupant's finger in a horizontal direction, and the fingerprint sensor sends a signal to the computing and control unit to process current weight measurements for the occupant whose fingerprint satisfies a pattern in the memory of the fingerprint sensor software in the ECU.

Another feature of the present invention is that in the multi-force restraint MFORS air bag system, instead of pushing a switch located on the dashboard, the front passenger pushes a touch surface or sensing surface of a fingerprint sensor and simultaneously lifts the feet up and keeps them from the floor for a second. In this case, the fingerprint sensor sends a signal to a computing and control unit of the air bag system to memorize the current weight of the front passenger measured by the weighing device. It takes milliseconds to get the current weight of the front passenger in the memory of the computing and control unit of the air bag system.

It is well known that besides the severity of an accident measured by a collision sensor, in each SRS system there are several main parameters measured by sensors that have to influence the force applied to the occupant's body such as weight, position of an occupant, and seat belt state. There may be also some other nonessential parameters that have to be detected by SRS sensors such as height, reclining angle detecting sensor, seat track position detecting sensor, heart beat sensor, motion sensor, etc. (U.S. Pat. Nos. 6,242,701 and 7,330,784). The entire contents of U.S. Pat. No. 6,242,701 are incorporated herein by reference thereto. In the proposed Multi-Force Supplemental Restraint Self-controlling system (MFORS system), safety protection of the different weight occupants is provided by applying different forces to their bodies through the air bag at the moment of an accident depending on their weights and some parameters that have to influence the force applied to the occupant's body. This force is larger for the heavier occupant and smaller for the lighter occupant and controlled by the calculated Modified occupant's Weight MW. The Multi-Force Supplemental Restraint System serves more than one vehicle occupant, and because of this, some descriptions and figures made for one occupant may be easily extended for more than one vehicle occupant.

BRIEF DESCRIPTION OF THE DRAWINGS

The above and other objects, features, and advantages will become more readily apparent from the following description, reference being made to the accompanying drawing in which.

DETAILED DESCRIPTION OF THE DRAWINGS

Figure 1:
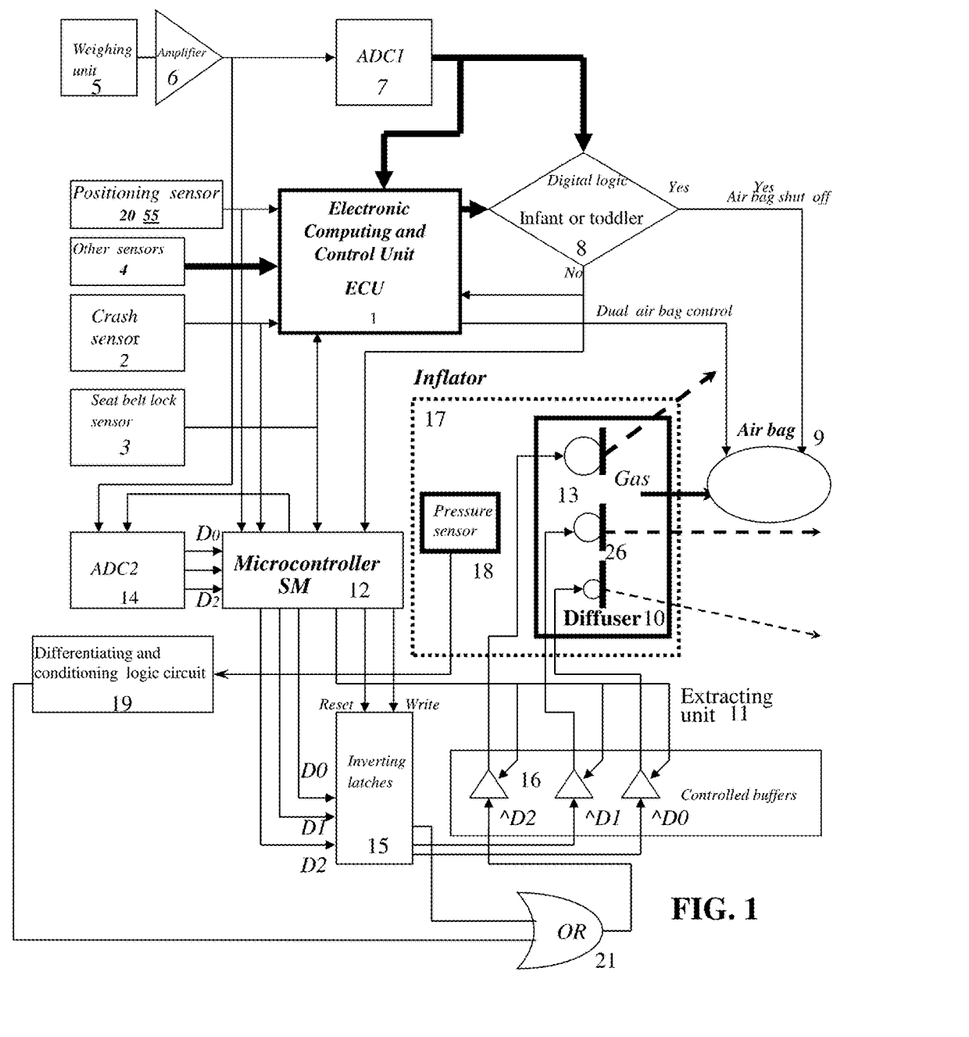
FIG. 1 is an outlined block diagram of the devices that comprise the on-board vehicle Multi-Force Supplemental Restraint Self-controlling system.

In FIG. 1 is presented a block diagram of connections among computing and control unit, inflator, extracting unit, air bag, and other parts of the MFORS system of the invention for one occupant of a vehicle and, as mentioned above, may be easily transformed for any number of vehicle occupants. The Electronic Computing and Control Unit (ECU) 1 is connected with a crash sensor 2, seat buckled sensor 3, occupant positioning sensor 20, and other sensors 4. ECU is connected with weighing unit 5 through an operational amplifier 6 and an Analog-to-Digital Converter (ADC1) 7. Depending on the result of analyzing the value of the weight of the occupant in a digital logic unit 8, ECU receives a signal that an infant or toddler is not in a car seat. If an infant or toddler is in a car seat, the digital logic unit 8 shuts off the air bag 9. All computation and control operations for the Diffuser 10 and extracting unit 11 are made by a supplemental microcontroller (SM) 12. This is made to decrease the time of operation on openings in the diffuser as much as possible in case of collision. The diffuser 10 is a part of inflator 17 and connects inflator and air bag 9. Microcontroller 12 receives a binary code from an Analog-to-Digital Converter (ADC2) 14 corresponded to the weight of the occupant depending on the number of the controlled openings 13 in the diffuser 10. In the case of FIG. 1, the diffuser 10 has 3 openings and an Analog-to-Digital Converter (ADC2) 14 has a 3-bit output $D_2$ $D_1$ $D_0$. Microcontroller 12 memorizes this code in a matrix of NOT-latches 15. So, the inverted code from the output of the Analog-to-Digital Converter (ADC2) 14 controls the buffers 16 of the extracting unit 11. Any buffer 16 of the extracting unit 11 may influence (to open a closed) an opening when the corresponding digit in output code of the Analog-to-Digital Converter ADC2 is 0, and there is a control signal from the Microcontroller (SM) 12 to open the output of this buffer. This control signal from the Microcontroller (DM) 12 may happen only when there is a collision. As was mentioned above, the opening 13 in the diffuser 10 removes a part of the gas moving from inflator to the air bag to atmosphere and decreases a force applied to the occupant' body. The microcontroller 12 changes the combination of the opened and closed openings according to the binary code of the modified weight of the occupant. This method gives in case of FIG. 1 (3 openings in the diffuser) opportunity to change a force applied to the bodies of occupants of the seven different weight categories according to their weights.

In FIG. 1 the inflator 17 comprises a pressure sensor 18 located proximate to the diffuser 10. The output of the pressure sensor 18 is connected to a conditioning circuit 19. The conditioning circuit comprising a differentiating branch to control the output signal not only by the level of the gas pressure in the inflator, but by the speed of its change also. When the pressure of the gas or a speed of the pressure change in the inflator becomes higher than a predetermined value, the conditioning circuit 19 receives a signal from the pressure sensor 18, memorizes it in a D flip-flop, and sends a logic signal 1 to the OR logic gate 21. The OR logic gate 21 has 2 inputs. One of these inputs is used by the microcontroller 12 to control the input of the most significant bit D2 of the buffer 16. Another input of the OR logic gate 21 is connected to the output of the conditioning circuit 19. If the pressure inside of the inflator or the speed of the pressure change during an accident is normal, the output of the conditioning circuit 19 equals logic 0. If during the car accident the gas pressure or the speed of the pressure change in the inflator becomes higher than permitted, the output of the conditioning circuit 19 equals logic 1, and the output of the most significant bit D2 of the buffer 16 will open an access to the atmosphere for a part of the gas generated by the inflator. This step will substantially decrease pressure in the inflator and prevent its rupturing.

The inflator may comprise several pressure sensors adjusted to the different levels of the gas pressure in the inflator. The output of each pressure sensor is connected to its conditioning circuit. The conditioning circuit, in turn, through another OR gate and another buffer of the extracting unit will control access to the atmosphere through another opening for another portion of the gas generated by the inflator. The structure of the MFORS system in FIG. 1 presented for employing a method of using a pre-opener wall to move a part of the gas to the atmosphere.

Let us discuss how the proposed MFORS system, whose structure is shown in FIG. 1 provides for occupants of different weight categories different forces applied to their bodies by employing the original (accurately measured at the beginning of a trip) not modified yet occupant's weight W and by using the predetermined values of the minimum and maximum allowable forces that may be applied to the occupants' bodies.

The main goal of the most regular contemporary SRS is not to deploy an air bag if an infant or toddler is in the car seat. In this case, in some SRS the weight of the 60 Lb occupant was taken as a threshold: 60 pounds or less is relayed as an infant or toddler, and the air bag is automatically shut off and would not deploy. As was mentioned above, in the advanced duel-depth air bags, 45 pounds or less is relayed as an infant or toddler. In this category, the air bag is automatically shut off and would not deploy. 46-108 pounds is relayed as a child or small adult. 109 pounds and above is considered a full size adult.

Assume, for example, that the one-chamber deployed air bag of the automobile MFORS system is designed to protect occupants whose weight is from 46 to 400 Lb at the severe crash, when the occupant is in the worst position, and the seat belt is not locked. The force applied to the body of the heaviest occupant, when the air bag is deployed, has to be $F_{400}$ lb, and the force applied to the body of the lightest occupant has to be $F_{46}$ lb. At the first step of calculation, we will find the force applied by the deployed air bag of the MFORS system to the body of different from 46 to 400 lb weight occupants by employing of the not modified yet accurate weight W of the occupants measured at the beginning of a trip.

Assume that the MFORS system will have 3 openings in the diffuser controlled by the extracting unit. In Table 1 are presented forces that will be applied to the occupants at the crash depending on their weight category in the range up to 400 lb in the case of employing their not modified original accurate weight W, where $F_{400}$ is the force defined by the car manufacturer that will be applied to the 400 lb heavy occupant by the air bag at the, for example, following morphological and main parameters of the car trip situation: severe car crash, occupant is in the worst position, and the seat belt is unlocked.

As we can see in the left part of Table 1, in the example with employing the not modified original weight of the occupant, the MFORS system provides for occupants of different weight categories different forces applied to the occupant's bodies.

TABLE 1

| Weight category of an occupant | Original weight W of the occupant is employed | | | |
|---|---|---|---|---|
| in the prospective occupant | | Force applied to the occupant depending on his/her weight | Modified weight MW of the occupant for a locked seat belt is employed | |
| Classification System | Original weight W | category in the Classification System | Modified weight MW | Force applied to the occupant |
| 1 | <50 | 0 | <50 | 0 |
| 2 | 50-100 | 0.25 * $F_{400}$ | (50-100) * $f(C_b)$ | 0.25 * $F_{400}$ * $f(C_b)$ |

TABLE 1-continued

| Weight category of an occupant | Original weight W of the occupant is employed | | Modified weight MW of the occupant for a locked seat belt is employed | |
|---|---|---|---|---|
| in the prospective occupant Classification System | Original weight W | Force applied to the occupant depending on his/her weight category in the Classification System | Modified weight MW | Force applied to the occupant |
| 3 | 101-150 | $0.375 * F_{400}$ | $(101\text{-}150) * f(C_b)$ | $0.375 * F_{400} * f(C_b)$ |
| 4 | 151-200 | $0.5 * F_{400}$ | $(151\text{-}200) * f(C_b)$ | $0.5 * F_{400} * f(C_b)$ |
| 5 | 201-250 | $0.625 * F_{400}$ | $(201\text{-}250) * f(C_b)$ | $0.625 * F_{400} * f(C_b)$ |
| 6 | 251-300 | $0.75 * F_{400}$ | $(251\text{-}300) * f(C_b)$ | $0.75 * F_{400} * f(C_b)$ |
| 7 | 301-350 | $0.875 * F_{400}$ | $(301\text{-}350) * f(C_b)$ | $0.875 * F_{400} * f(C_b)$ |
| 8 | 351-400 | $F_{400}$ | $(351\text{-}400) * f(C_b)$ | $F_{400} * f(C_b)$ |

As we may see from Table 1, the resolution of the 3-bit MFORS that works with one-chamber air bag is around 12%.

Before doing any control operations, microcontroller SM by receiving some information from the ECU provides a modification of the occupant's original weight W, accurately measured at the beginning of a trip, to get a current Modified occupant's Weight MW that is a function of the current morphological and driving factors. The modified weight MW of the occupant is further employed in the MFORS system as a basic argument parameter to extract to output atmosphere a part of the gas moving from inflator to the air bag to get the appropriate different forces applied to the bodies of different weight category occupants.

Let us discuss a process of modification of the original accurate weight W, measured at the beginning of the trip, to make it dependable on any current change in a morphological or driving situation during a trip. Assume, that the same type of one-chamber air bag of the automobile MFORS system, as used in the previous example, is employed to protect occupants whose weight is from 46 to 400 lb at the severe crash, when the occupant is in the same worst position, and there is just one change relative to the first example in Table 1 that the seat belt is locked.

The force applied in this case to the body of the heaviest occupant, when the air bag is deployed, has to be less than $F_{400}$ lb because the seat belt is locked, and the force applied by air bag to the occupant's body may be decreased. The force required to apply for security purposes to the occupant's body at the crash depends on the morphological and driving factors during a trip (severity of the crash, position of the occupant, state of the seat belt, etc.). The rate of this dependency is well known by the car manufacturer, and may be represented, for example, by the correlation coefficients or functions in the DM or ECU software. Some of these correlation coefficients are represented in Table 2. Occupant's modified weight MW may be linear or nonlinear function of the correlation coefficients or their combination. These functions have to be provided by the car manufacturer in the SM or ECU software.

In our example, correlation coefficient $C_b$ related to the state of the seat belt may be represented as $$MW = f(W, C_b), \quad (4)$$

where it may be $0 < C_b \le 1$ and $C_b = 1$ when the seat belt is buckled.

TABLE 2

| No. | Morphological or driving factor | Coefficient dependency of applied force on morphological or driving factor | Modified weight of the occupant MW |
|---|---|---|---|
| 1 | Severity of the crash | $C_s$ | $f(C_s, W)$ |
| 2 | Occupant's position | $C_p$ | $f(C_p, W)$ |
| 3 | State of the seat belt | $C_b$ | $f(C_b, W)$ |

Figure 2:
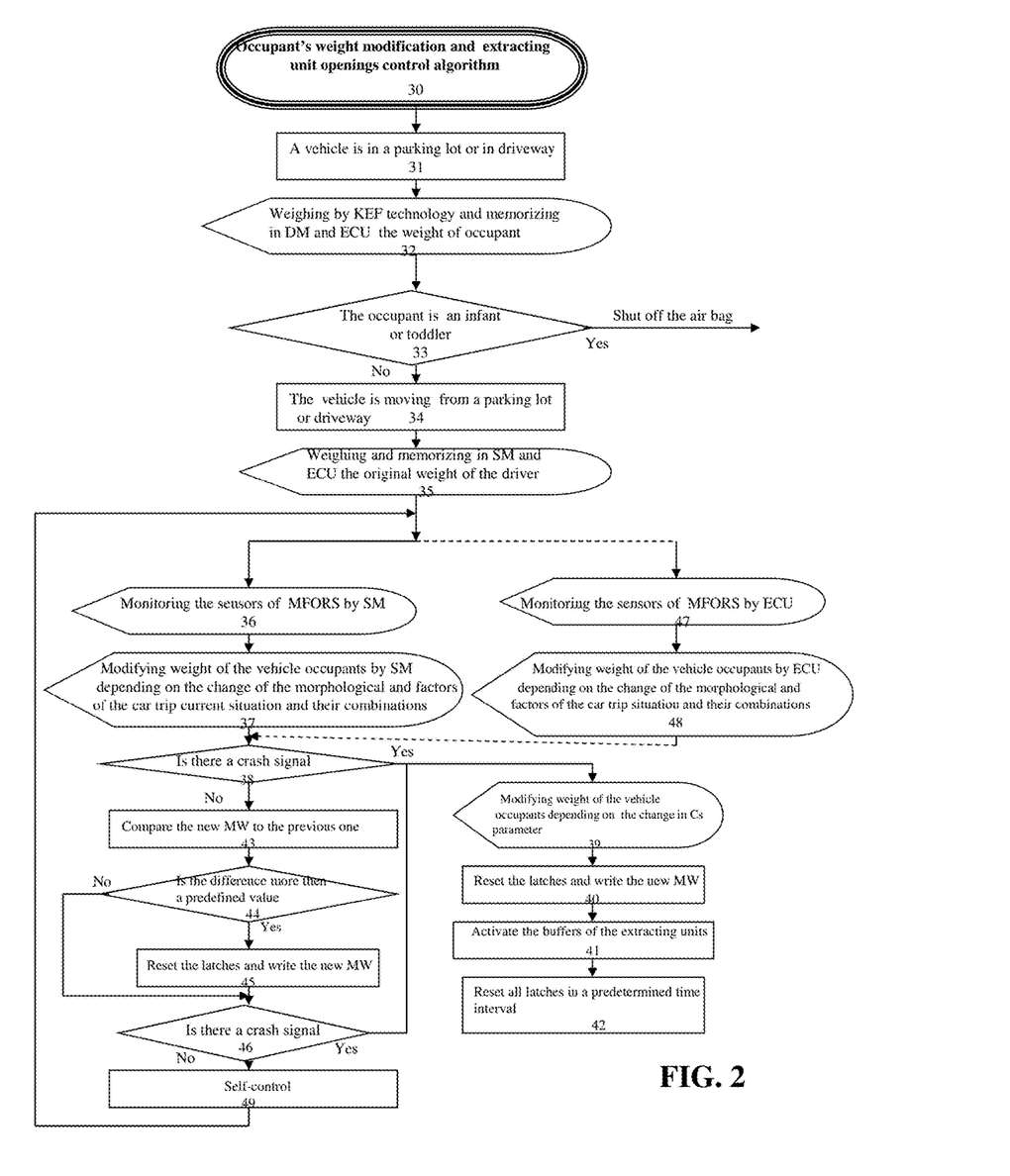
FIG. 2 is a flowchart for the algorithm of occupant's body weight modification and the steps of the extracting unit openings control.

In FIG. 2 is presented the algorithm 30 of occupant's body weight modification and the steps of the extracting unit openings control. The force applied to the occupant's body is controlled through an occupant's modified weight MW depending on the morphological and driving factors. When a vehicle is in a parking lot or in driveway 31, the original weight of each passenger, to whose car seat a weighing unit is attached, may be accurately and conveniently weighed in 32 by a passenger weighing innovative KEF technology, and his/her weight will be memorized in the SM and ECU. The same weighing procedure may be made for the driver. The measured weight is checked in 33. If the occupant is an infant or toddler, the air bag will be shut off and will not be deployed in a possible crash during the current trip. The driver may be accurately and conveniently weighed also, and his/her weight will be memorized in ECU and SM in step 35.

To eliminate any possible delay in air bag deployment at the moment of a crash, supplemental microcontroller SM is used for the occupant's weight modification. For this procedure, SM employs in 36 original weight W of the occupants in combination with the data received by direct connections through ECU from morphological parameters and parameters and factors of the car trip current situation and all their combinations according to the correlation coefficients, such as in Table 2, that are available from car manufacturer and are specific for each vehicle.

As result, SM calculates in 37 the current modified weight MW of all vehicle occupants, which depends on morphological parameters and the factors of the car trip situation and all their combinations. This procedure is short enough, and SM provides in 37 a current modified weight MW of all vehicle occupants at the time of the crash without delay for the air bag deployment. SM checks in 38 if there is a signal from the crash sensor. If there is not a signal from the crash sensor, SM compares in 43, 44 the previously memorized value of the MW to the new value of the modified weight of the occupant $MW_N$.

SM changes the value of the current MW if the change in the new modified occupant's weight is larger than a predefined value. SM compares the $MW_N$ with the values of the $MW_{max}$ and $MW_{min}$, where the $$MW_{max} = MW + \Delta \text{ and } MW_{min} = MW - \Delta \quad (5)$$

and $\Delta$ is a predetermined value. If in 44 the $MW_N > MW_{max}$ or $MW_N < MW_{min}$, SM substitutes the value of the current MW by the $MW_N$ that becomes a new current MW. SM in 45 resets the latches and substitutes the old MW by the $MW_N$ by writing its value into the latches 15. SM checks in 46 if there is a signal from the crash sensor. If there is not a signal from the crash sensor, SM goes to 49 to provide self-control. After that it goes to 36 and repeats the procedures of monitoring of the sensors and modifying the previous value of the MW if it is necessary to do so. If in the step 38 or in the step 46 there is a signal from the crash sensor, SM in step 39 changes the last modified value MW by the correlation coefficient $C_s$ according to the value of the crash severity level received from the crash sensor. SM in 40 resets the latches and substitutes the last MW by the new one calculated in 39 by writing its value into the latches 15. After that in 41, SM activates buffers of the extracting unit. As a result, the large output currents of the buffers that satisfy to the 0 digits in the code of the new modified weight of the occupant, eliminate the pre-opener walls of according openings of the extracting unit before the gas from the inflator will come to the diffuser. When gas comes to the diffuser, part of it will go to the atmosphere but not to the air bag and will decrease the force applied to the occupant's body according to his/her weight because the seat belt was locked. In a predetermined time interval after the air bag was deployed, SM in 42 will reset all latches, and the rest of gas will be able to go to the atmosphere through all openings of the extracting unit.

ECU may be also used for monitoring sensors of the MFORS and modification of the occupant's original weight. A disadvantage of this version of the weight modification is that it may take too long to prepare on time the current modified weight at the crash because ECU is busy with other computation and control responsibilities and may delay the air bag deployment. In FIG. 2 is shown by the dashed line between 35 and 47 how ECU starts to monitor the sensors of MFORS. After modifying the weight in 48, ECU goes to 38, and checks if there is a signal from the crash sensor. If there is not a signal from the crash sensor, ECU compares in 43,44 the previously memorized value of the MW to the new value of the modified weight of the occupant $MW_N$ calculated by ECU. After this step ECU repeats all steps that made by SM in this algorithm and were described above.

Of course, there may be other methods for modification of the original weight of the occupant depending on the morphological data and factors of the car trip situation.

Table 3 presents the data for different structures of the MFORS system.

TABLE 3

| No. | Type of the air bag | The MFORS resolution depending on the number of the openings in the diffuser | | | | The MFORS number of possible occupant weight categories in extended prospective Occupant Classification System depending on the number of the openings in the diffuser | | | |
|---|---|---|---|---|---|---|---|---|---|
| | | 2 | 3 | 4 | >4 | 2 | 3 | 4 | >4 |
| 1 | One - chamber | 25% | 12% | 6% | ≤3% | 4 | 8 | 16 | ≥32 |
| 2 | Dual - depth | 12% | 6% | 3% | ≤1% | 8 | 16 | 32 | ≥64 |

Figure 3:
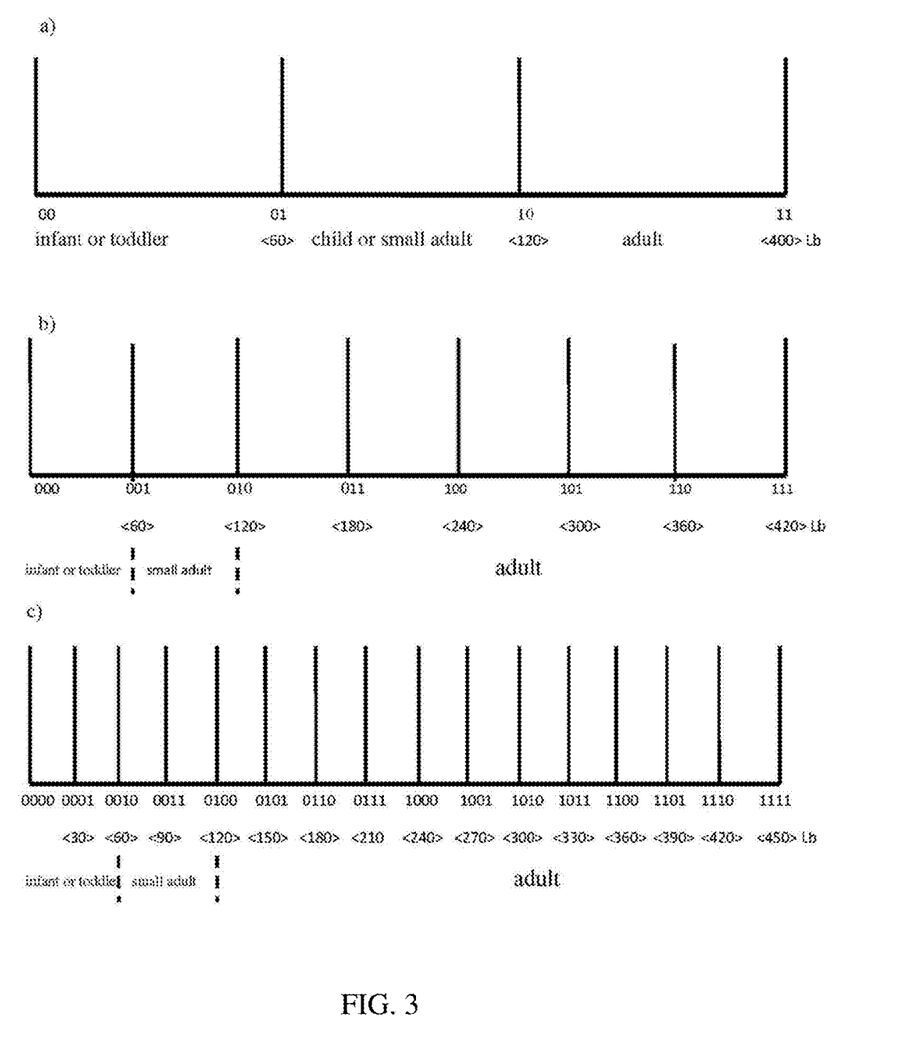
FIG. 3 is a graphical presentation of the code of the gas control unit and class and position of occupants of different weight in three different on-board Passenger Classification Systems.

In FIG. 3 shown a graphical presentation of the possible binary code of the gas control unit and class and position of occupants of different weight in three different Passenger Classification Systems. All 3 systems have approximately the same weight of the theoretical heaviest occupant (400, 420, and 450 lb) to make the numbers whole. In FIG. 3, a is the Passenger Classification System that has 3 classes of occupants. This Passenger Classification System has 3 weight points that may control the force applied to the body of a passenger. In FIG. 3, b is the proposed extended Occupant Classification System for the 3-bit Multi-Force Restraint one-chamber air bag System (MFORS-3), which has a 3-bit extracting unit and 3 openings in the diffuser. This Occupant Classification System has 7 weight points that may control 7 different forces applied to the bodies of 7 different weight occupant classes In FIG. 3, c is the proposed extended Occupant Classification System for the 4-bit Multi-Force Restraint one-chamber air bag System (MFORS-4) that has a 4-bit extracting unit and 4 openings in the diffuser. This Occupant Classification System has 15 weight points that may control 15 different forces applied to the bodies of 15 different weight occupant classes. If we assumed that the class of adult category starts from weight 100-120 lb, the same extra force will be applied to 100 lb and 400 lb weight (300 lb weight difference) occupants in FIG. 3*a*, the same extra force may be applied to the two occupants who have 60 lb weight difference in the MFORS-3 restraint system, and the same extra force may be applied to the two occupants who have 30 lb weight difference in the MFORS-4 restraint system.

Figure 4:
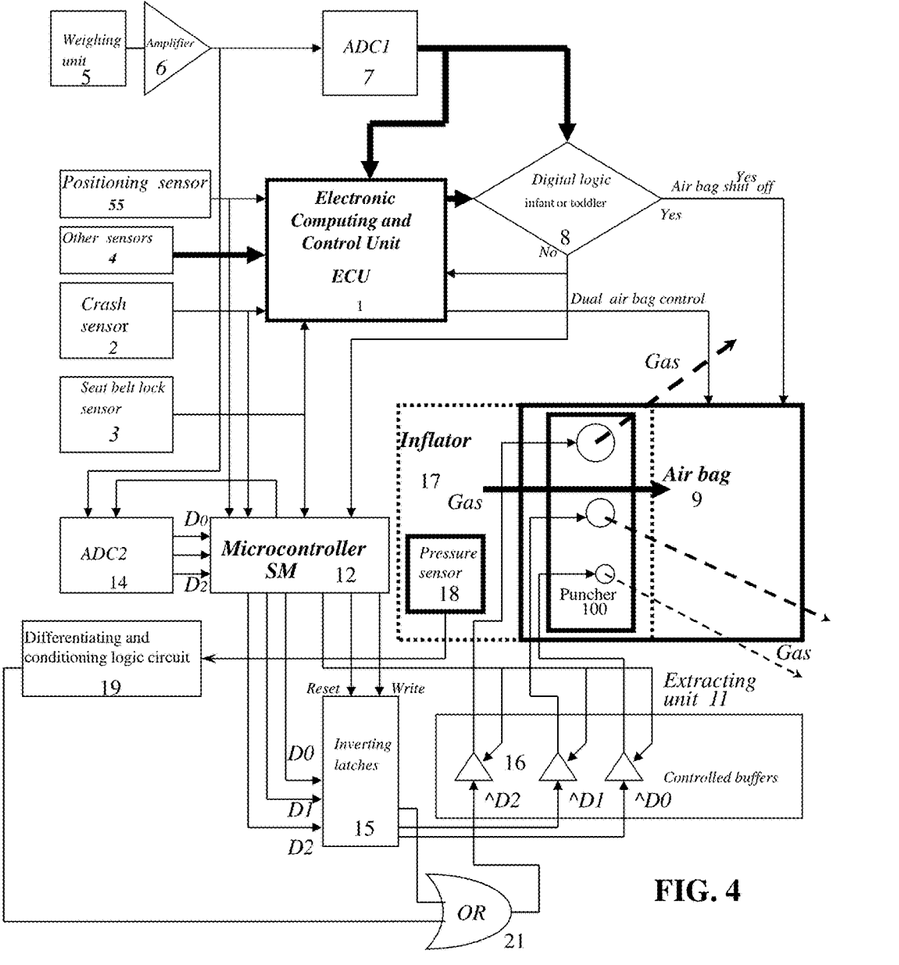
FIG. 4 is an outlined block diagram of the on-board vehicle Multi-Force Restraint system employing a hole puncher.

FIG. 4 presented a block diagram of the on-board vehicle Multi-Force Supplemental Restraint Self-controlling system employing a hole puncher 100, which controls a part of the gas that will move into the atmosphere. The punch of the hole puncher is controlled by an electromagnet 101 (not shown in FIG. 4) and located above the material of the air bag 9 proximate to the point where the material of the air bag 9 is attached to the inflator 17. The matrix of the hole puncher is located on the surface of the inflator 17 underneath the material of the air bag 9. The electromagnet 101 of the hole puncher 100 is controlled by a voltage pulse generated by a capacitor controlled by a switch connected to the according buffer 16 of the extracting unit 11. This voltage pulse is generated in the same way as the voltage pulse to activate the igniter is generated. When a signal of collision is received from the sensor 2, the according buffer 16 of the extracting unit 11 turns on a switch to discharge the according capacitor, which creates a pulse for the electromagnet 101 of the hole puncher, which in turn hits the surface of the air bag 9, cuts it, and makes a hole in it through which a part of the gas moving from inflator 17 (when the inflator will be activated) to the air bag 9, will move to the atmosphere.

Figure 5:
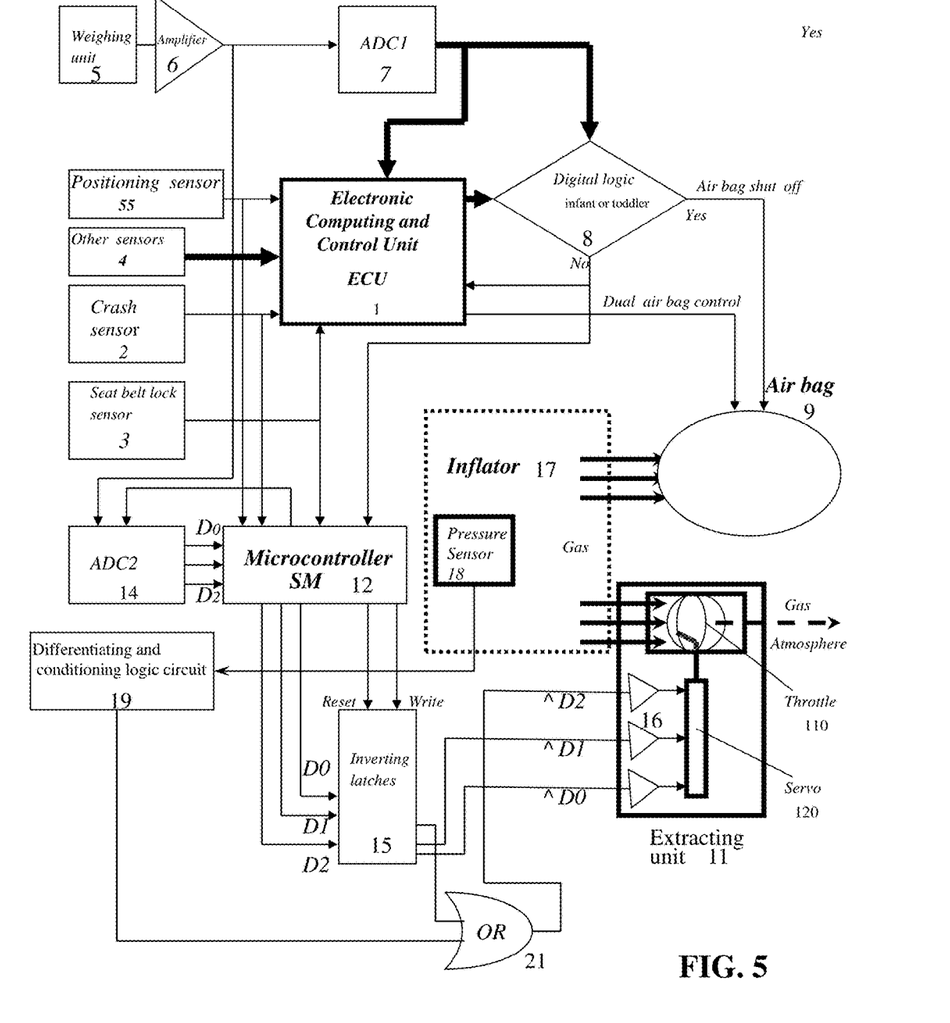
FIG. 5 is an outlined block diagram of the on-board vehicle Multi-Force Restraint system employing a mini-throttle and digital servo.

FIG. 5 is an outlined block diagram of the on-board vehicle Multi-Force Restraint system employing an extracting unit 11 comprising a mini-throttle 110 to remove a part of the gas generated by inflator 17 and direct it to atmosphere instead of moving it to the air bag 9. The mini-throttle moves part of gas from the inflator to outside atmosphere by the input signal depending on the modified weight signal MW. The mini-throttle in turn is controlled by a 80°-90° angle analog or digital servomechanism (servo) 120 having a metal gear and employing a position transducer. The servo 120 is controlled by supplemental microcontroller 12 through latches 15 and buffers 16 of the extracting unit 11.

It being understood that the Multi-Force Supplemental Restraint Self-controlling system (MFORS) may include a microprocessor, microcontroller or other equivalent processing device capable of executing commands of computer readable data or program for executing a control algorithm that controls the operation of the system in order to perform the prescribed functions and desired processing, as well as the computations therefore (e.g., the execution of fourier analysis algorithm(s), the control processes prescribed herein, and the like), the system may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the described features.

I claim:

1. An on-board vehicle multi-force restraint self-controlling system comprising:
    at least one inflator that is connected to a core of an air bag through calibrated or changeable opening(s) to outside atmosphere controlled by a supplemental microcontroller employing morphological parameters and factors of a car trip situation;
    a computing and control unit that is operatively connected to the supplemental microcontroller and to at least one of a crash sensor, seat belt sensors, position of occupants sensors that measure morphological parameters and factors of the car trip situation, and wherein the computing and control unit controls inflation of the air bag through a digital logic circuit;
    at least one extracting unit, wherein inputs and control signals of buffers of the at least one extracting unit are connected to outputs of the supplemental microcontroller through inverting latches and outputs of the buffers are connected to at least one of a pre-opener wall, valve, hole puncher, or servomechanism;
    at least one occupant weighing apparatus having a weighing unit that is operatively coupled to a seat of the on-board vehicle multi-force restraint self-controlling system and to the supplemental microcontroller and computing and control unit through an operational amplifier and analog-to-digital converter and wherein a weighing moderator of the at least one occupant weighing apparatus comprises a switch operatively connected to the computing and control unit and wherein the switch is located on a substantially vertical part of a vehicle interior;
    at least one pressure sensor, which is located in the at least one inflator and is connected with the buffer of the extracting unit through a differentiating and conditioning logic circuit.

2. The on-board vehicle multi-force restraint self-controlling system as in claim 1, wherein the at least one inflator comprises a diffuser connected to the air bag and the diffuser in turn comprises at least one calibrated opening on its surface, which is connected to the outside atmosphere by an electrical valve whose control voltage signal is connected to the buffer of the extracting unit or the calibrated opening is connected to a pre-opener wall or a rupturing disk that comprising a small portion of a primary explosive located proximate to the pre-opener wall or the rupturing disk between the according opening and the outside atmosphere, and the detonator of this explosive is connected to the according buffer of the extracting unit or the detonator is ignited by hitting it with a force of the armature of a solenoid connected to the according buffer of the extracting unit.

3. The on-board vehicle multi-force restraint self-controlling system as in claim 1, wherein the extracting unit comprising a hole puncher that consists of an electromagnet coil which is connected to a capacitor controlled by a switch connected to the according buffer of the extracting unit, and the matrix of the hole puncher is located on the surface of the inflator underneath the material of the air bag proximate to the point where the material of the air bag is attached to the inflator, and the punch is located above the material of the air bag.

4. The on-board vehicle multi-force restraint self-controlling system as in claim 1, wherein the extracting unit comprising a mini-throttle that is connected to the inflator from one side and to the outside atmosphere from the other side, and position of the mini-throttle is controlled by the metal gear of the 80° - 90° angle analog or digital servomechanism (servo) employing a position transducer, and the digital input of the servo is connected to the according buffers of the extracting unit.

5. The on-board vehicle Multi-Force Supplemental Restraint self-controlling System as in claim 2, wherein the diffuser comprising calibrated openings on its surface, whose effective diameters are related to each other by binary number system.

6. The on-board vehicle Multi-Force Supplemental Restraint self-controlling System as in claim 1, wherein the weighing moderator comprises a fingerprint sensor whose touch surface or sensing surface is located on a substantially vertical part of the vehicle interior and an output of the fingerprint sensor is connected to the input of the computing and control unit.

7. The on-board vehicle Multi-Force Supplemental Restraint self-controlling System as in claim 1, wherein the simplified on-board vehicle weighing apparatus for a driver weighing in a running vehicle comprising:

a vehicle driver weighing unit attached to the driver's seat and a weighing moderator that is a hanging pedal from a firewall, on which the left foot of the driver is secured above the floor, comprising a switch, and the output of the weighing unit is connected to the input of the microcontroller and the computing and control unit, and the inputs of the computing and control unit are also connected to the outputs of the gear selector, brake pedal, gas pedal, weighing moderator pedal switch, and the input of the number of weight measurement samples counter is connected to the output of computing and control unit, and the output of the counter is connected to the input of computing and control unit, and the driver's position sensors are secured underneath a seat cushion interior.

8. The on-board vehicle Multi-Force Supplemental Restraint self-controlling System as in claim 2, wherein the diffuser comprising 2 or more openings, and the computing and control unit comprising in the memory the 2-bit, 3-bit, or 4-bit binary code of the significant occupant weighing points of the prospective extended Occupant Classification System, in which accordingly 4, 8 or 16 points of both the designated range of the weight of the vehicle occupant and the according weight classification position of an occupant are given.

9. The on-board vehicle Multi-Force Supplemental Restraint self-controlling System as in claim 1, wherein the inflator comprising at least one electronic or mechanical pressure sensor, whose output is connected to a differentiating and conditioning circuit and the output of the differentiating and conditioning circuit is coupled through one of the buffers of the extracting unit to a winding of the electrical valve or to a detonator of a portion of a primary explosive located in a pre-opener wall.

10. A method of the different weight occupants protection and prevention of extra force applied to the occupant's body providing by on-board vehicle multi-force supplemental restraint self-controlling system in case of collision comprising the following steps:
measuring the original weight of the vehicle occupant at the beginning of a trip by a simplified weighing apparatus based on innovative KEF weighing technology and memorizing in the memory of the computing and control unit and a supplemental microcontroller a binary code of the weight/mass of a driver and each passenger to whose car seat the weighing unit is attached;
monitoring the sensors of the multi-force supplemental restraint self-controlling system during a trip by the computing and control unit and a supplemental microcontroller;
modifying the original weight measurements of the vehicle occupant by the current values of the morphological data and factors of the car trip situation and by employing tables and functions of the correlation coefficients memorized in the memory of the computing and control unit and employing during this modifying a predetermined emulation value of the severity crash level;
continuously checking the existence of the crash sensor signal by the computing and control unit and a supplemental microcontroller;
continuously modifying the previously modified weight measurements of the vehicle occupants by the computing and control unit and a supplemental microcontroller if the current data from sensors have been changed more than by the predetermined value;
rewriting in the predefined time interval the last results of the modified weight calculations to the latches and apply the output values of the latches to the inputs of the extracting unit buffers operatively connected to the latches;
in case of receiving a signal from the crash sensor, activate the buffers of the according pre-opener walls, valves, hole puncher, or servomechanism by the supplemental microcontroller.

11. The method as in claim 10, wherein preventing of extra force applied to the different weight categories vehicle occupants in the on-board vehicle multi-force supplemental restraint self-controlling system is provided by employing correlation coefficients comprising the following steps:
accurate measuring by innovative KEF weighing technology original weight W of a vehicle occupant including the foot part at the beginning of a trip by a weighing unit attached to his/her car seat;
memorizing the measured original weight W of the occupant in the memory of a computing and control unit and a supplemental microcontroller;
modifying the original weight of the vehicle occupants during the trip according to the function;

$$MW = f(W, Cs, Cb, Cp, \ldots, Cn), \quad (1)$$

where W is the original weight of the occupant,
MW is modified weight of the occupant,
Cs, Cb, Cp, ..., Cn are correlation coefficients employed in the current SRS;
restricting of extra force applied to the vehicle occupants according to the function $$Fo = \mu o * Fh, \quad (2)$$

where Fo is the restricted force applied to the occupant by the air bag in the current SRS system,
Fh is a permitted maximal force applied to the heaviest occupant by the air bag in the current SRS,
μo is a relative position of the occupant's weight category to the maximal predefined weight of an occupant in the prospective extended Occupant Classification System, and $$\mu o = MW/Wh, \quad (3)$$

where Wh is the maximal predefined weight of an occupant in the prospective extended Occupant Classification System.

12. The method of preventing of extra force applied to the vehicle occupants of different weight classes as in claim 10, wherein modifying the original weight of the vehicle occupants comprising the following steps:
collecting current trip data by the computing and control unit through according conditioning circuits from the crash sensor, occupants' weighing units attached to their car seats and employing the innovative KEF weighing technology, occupants' position sensors, seat buckled sensors, and other sensors employed in the current SRS;
comparing by a digital logic circuit the code of original weight of an occupant memorized in the computing and control unit to a predefined value that matches the weight of an infant or toddler;
shut off and not deploy the air bag if an infant or toddler is in the car seat;
calculating a modified weight MW of an occupant, if neither an infant nor toddler is in a car seat, by using, at the first time modifying the weight of the occupant during the trip, the original weight of an occupant memorized in the computing and control unit by substituting it by the modified weight MW employing tables and equations provided by the car manufacturer, where the modified weight MW of the occupant is a multi-function of the correlation coefficients Cs, Cb, Cp, Cn , which are in turn dependent on the current morphological parameters and the factors of the car trip situation, and the original weight W of an occupant is a constant;

modifying the previously modified weight MW of an occupant memorized in the computing and control unit by substituting it with the new modified weight MW if the change in the new modified occupant's weight calculated in the computing and control unit is larger than a predefined value, and the original weight W of an occupant is employed as a constant.

13. The method of preventing of extra force applied to vehicle occupants with different weight categories as in claim 10, wherein restricting of extra force applied to these occupants by following steps:

accurate weighing by employing the innovative KEF weighing technology and memorizing the original weight of the occupant at the beginning of a trip by a weighing unit and a computing and control unit and a supplemental microcontroller accordingly;

modifying the accurate original weight of the occupant during the trip by the computing and control unit and a supplemental microcontroller according to the current morphological parameters and the factors of the car trip situation;

before a possible crash situation, bring the state of the inputs of the extracting unit buffers, that control the pre-opener wall, valve, hole puncher, or servomechanism, in a position where they satisfy the binary code of the last modified weight of the occupant;

by receiving a signal from the crash sensor:
a) activating inflator and air bag by the computing and control unit according to the predefined requirements,
b) modifying by the supplemental microcontroller the last modified weight of the vehicle occupant depending only on both the value of the current crash severity (instead of its emulated value) and the correlation coefficient according to the current crash severity,
c) rewriting by the supplemental microcontroller this modified weight to the latches and applying the output value of the latches to the inputs of the extracting unit buffers and activate the outputs of these buffers,
d) resetting all latches by the supplemental microcontroller in a predetermined time interval.

14. The method as in claim 10, wherein it provides a correct force applied to the on-board vehicle multi-force supplemental restraint self-controlling system occupant's body by the air bag according to the prospective extended Occupant Classification System and comprises the following steps:

accurately measuring an original weight of the vehicle occupant at the beginning of a trip by a weighing unit employing the innovative KEF weighing technology and memorizing in the memory of the computing and control unit and the supplemental microcontroller a binary code of the weight measurements of a driver and each passenger to whose car seat a weighing unit is attached;

continuously checking the existence of the crash sensor signal by the computing and control unit and the supplemental microcontroller;

continuously modifying the previously modified weight measurements of the vehicle occupants by the computing and control unit or a supplemental microcontroller if the current data from sensors have been changed more than by the predetermined value;

activating inflator and air bag by the computing and control unit while receiving a signal from the crash sensor;

resetting all latches;

modifying by the supplemental microcontroller the last modified weight of the vehicle occupant depending on both the value of the crash severity and the correlation coefficient of the severity crash;

rewriting to the latches, whose outputs are operatively connected to the inputs of the extracting unit buffers, the code of the modified in the previous step weight;

activating by the crash sensor signal the outputs of the extracting unit buffers whose outputs are operatively connected to the according pre-opener walls, valves, hole punchers, or servomechanisms, in a position where they satisfy the binary code of the last modified weight of the occupant.

15. The method as in claim 10 wherein measuring of an original weight of the driver in the on-board vehicle multi-force supplemental restraint self-controlling system is provided in a running conventional vehicle comprising the following steps:

monitoring the state of a vehicle with the turned on engine when it did not yet start to move from a garage, driveway, or a parking lot by checking a signal from the gear selector that it is in a Park position;

checking that the driver is in a car seat by a signal from the weighing unit attached to the driver's car seat;

checking that the driver's left foot is on a pedal of a weighing moderator located proximate to the left foot of the driver by a signal from the switch of the weighing moderator;

checking that the right foot of the driver is on the brake pedal by a signal from the brake pedal;

checking that driver's hands are on a steering wheel by the signal from the switch of a weighing moderator's fingerprint sensor secured on the steering wheel;

monitoring the state of a vehicle when the driver is ready to move the vehicle from a garage, driveway, or a parking lot by checking a signal from the gear selector that it is shifted from the Park position to Drive/Reverse position;

monitoring the state of the vehicle when it starts to move from a garage, driveway, or a parking lot by checking a signal from the brake pedal that the brake is released;

receiving the original weight of the driver from the weighing unit connected to the driver's seat and memorizing it in the computing and control unit and the supplemental microcontroller while the brake is released and while receiving signal from the switch of the weighing moderator, on which the left foot of the driver is secured;

continuing to check by the computing and control unit the signals from the brake pedal and gas pedal;

processing the driver weight measurements by the computing and control unit and supplemental microcontroller;

continue receiving and processing driver's weight measurements by the computing and control unit and the supplemental microcontroller while monitoring the state of signals from the brake pedal, gas pedal, and switch of the weighing moderator, on which the left foot of the driver is secured by the computing and control unit;

transmitting processed data from the output of computing and control unit to the input of the smartphone.

16. A method as in claim 10, wherein an on-board vehicle multi-force supplemental restraint system provides its self-controlling feature comprising the following steps:

continuously monitoring the system's main function by the supplemental microcontroller that employs current trip signals and test signals to assess the grade of the on-board vehicle multi-force supplemental restraint self-controlling system functionality;

employing the original weight of the occupant, occupant's position signal, seat belt state signal, etc. and emulated a predetermined value of the severity crash signal that equals 50% of a maximum predicted in the system severity crash signal level for modifying the original occupant's weight and calculating the predicted conditions of the output buffers of the extracting unit, comparing by the supplemental microcontroller the conditions with the real current signals received from the output buffers of the extracting unit;

checking by the supplemental microcontroller the signal from the mini-throttle position sensor;

issuing a warning if a problem in the on-board vehicle multi-force supplemental restraint self-controlling system functionality is found.

17. The method as in claim 10 wherein measuring the original weight of the driver in the on-board vehicle multi-force supplemental restraint self-controlling system in a running self-driving vehicle comprising the following steps:

monitoring existence of the driver in a car seat by a weighing unit connected to the seat and whose output is connected to the computing and control unit;

pushing horizontally by the driver's finger a touch surface or sensing surface of a fingerprint sensor, located proximate to the driver on the dashboard, and simultaneously lifting feet above the floor and keeping them up during the weight measurement;

receiving and memorizing the original weight of the driver by the computing and control unit from the weighing unit connected to the driver's seat;

processing the measured weight of the driver while receiving signal from the fingerprint sensor of the weighing moderator that the fingerprint of the driver satisfies to his/her fingerprint pattern in the memory of the computing and control unit;

eventually modifying during the trip the memorized original weight of the driver by a computing and control unit depending on the current values of the morphological data and factors of the car trip situation.

18. The method of preventing of extra force applied to the vehicle occupants in the Multi-Force Supplemental Restraint System as in claim 10, wherein accurate weighing of a vehicle front passenger comprising the following steps:

monitoring existence of a front passenger in a car seat by a weighing unit connected to the seat and whose output is connected to the computing and control unit;

pushing horizontally by the front passenger a touch surface or sensing surface of a fingerprint sensor, located proximate to the front passenger, and simultaneously lifting feet above the floor and keeping them up during the weight measurement;

receiving and memorizing the original weight of the front passenger by the computing and control unit and weighing unit connected to the front passenger's seat;

processing the measured weight of the front passenger while receiving signal from the fingerprint sensor of the weighing moderator that the fingerprint of the occupant satisfies to his/her fingerprint pattern in the memory of the computing and control unit;

eventually modifying during the trip the measured original weight of the front passenger by a computing and control unit depending on the current values of the morphological data and factors of the car trip situation.

19. A method of improving security of the air bags for children by monitoring the activated children seats comprising the following steps:

monitoring a type or category of a child car seat fixed in a car by a signal from the child's seat to a Computing and Control unit when the child's seat was installed by receiving an electrical signal through a special shape and color coded electrical connector to discriminate different children seats;

weighing a child's car seat and sending a warning if the measured weight of the child doesn't satisfy the requirements of the child seat category defined in the previous step of monitoring.

* * * * *